Nov. 11, 1952

C. BARRANGO 2,617,671

PIVOT JOINT

Filed Nov. 23, 1946

INVENTOR.
CARMEN BARRANGO
BY
Baldwin Vale
ATTORNEY

Nov. 11, 1952  C. BARRANGO  2,617,671
PIVOT JOINT

Filed Nov. 23, 1946

INVENTOR.
CARMEN BARRANGO
BY
Baldwin Yale
ATTORNEY

Patented Nov. 11, 1952

2,617,671

UNITED STATES PATENT OFFICE 2,617,671

PIVOT JOINT

Carmen Barrango, San Francisco, Calif.

Application November 23, 1946, Serial No. 711,985

2 Claims. (Cl. 287—14)

This invention relates to manikins and more particularly to articulated manikins for the display of garments.

Among the objects of the invention is the provision of a manikin simulating the postures of the human body.

Another object is the provision of torso and limb articulated joints adapted to frictionally maintain adjusted postures.

Another object is the provision of mid-torso and hip and knee joints that respond to bending stresses applied by the manipulator.

A further object is the provision of knee joints that closely simulate the contour of the human knee when bent, by the provision of a shield overlying the juncture of thigh and knee portions of the legs.

Other objects and advantages will appear as the description proceeds. In the specification and the accompanying drawings the invention is disclosed in its preferred form. But it is to be understood that it is not limited to this form, because it may be embodied in modifications within the spirit of the invention as defined in the claims following the description.

The articulated joints at the neck, ankles and arms are conventional, except for the fabric masking at neck and ankles.

Figure 2:
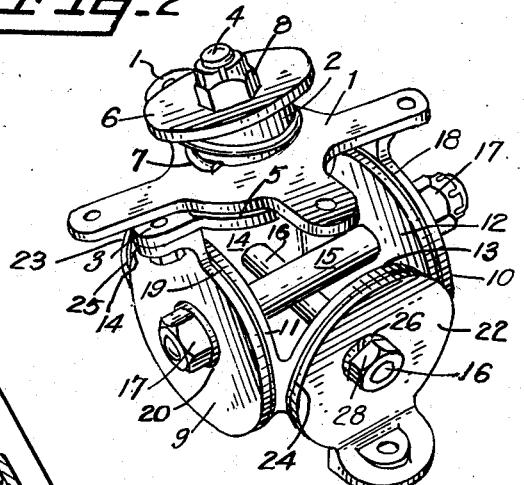
Fig. 2 is a perspective detail from above of the friction mid-torso and hip joint assembly.

In detail the structure shown in Fig. 2, comprises the top plate 1 having the hub 2, the friction yoke 3, assembled on the stud bolt 4, with the interposed fiber lining 5. The cap 6 bears against the expansion spring 7 and forces the plate 1 against the fiber friction lining 5 and the top yoke 3, when tension is applied to the bolt 4 by the nut 8.

The interspaced alined friction plates 9, 10 form part of the yoke 3 and straddle the sides 11, 12 of the quadrangular box having the similar ends 13, 14, respectively centered on the criss-crossed transverse and frontal bolts 15, 16. The friction plates 9, 10 are drawn inward by the nut 17 on the bolt 15 to create frictional pressure against the interposed fiber inserts 18, 19. The helical nut locks such as 20, allow a yielding pressure against the sides of the discs 9, 10 so that they will bind the yoke, formed by the plate 3 and its dependent discs 9, 10, but allow manual adjustment of the frictional assembly.

The bolt 16 centers a similar assembly of the brackets 22, 23 pressed against the ends 13, 14 of the quadrangular box with the interposed fiber friction inserts 24, 25 and the resilient helical nut lock 26, beneath the nut 28.

The above described universal joint is inserted in the mid-riff section of the manikin torso by attaching the plate 1 to the bottom A' of the upper torso A and similarly attaching the angular lugs of the brackets 22, 23 to the diaphragm B' closing the top of the hip section B. This gives the upper torso A axial adjustment relative to the hip section B on the center bolts 15, 16, and rotative relative to each other on the stud bolt 4; all frictionally controlled to maintain the manually adjusted pose of the torso.

Figure 1:
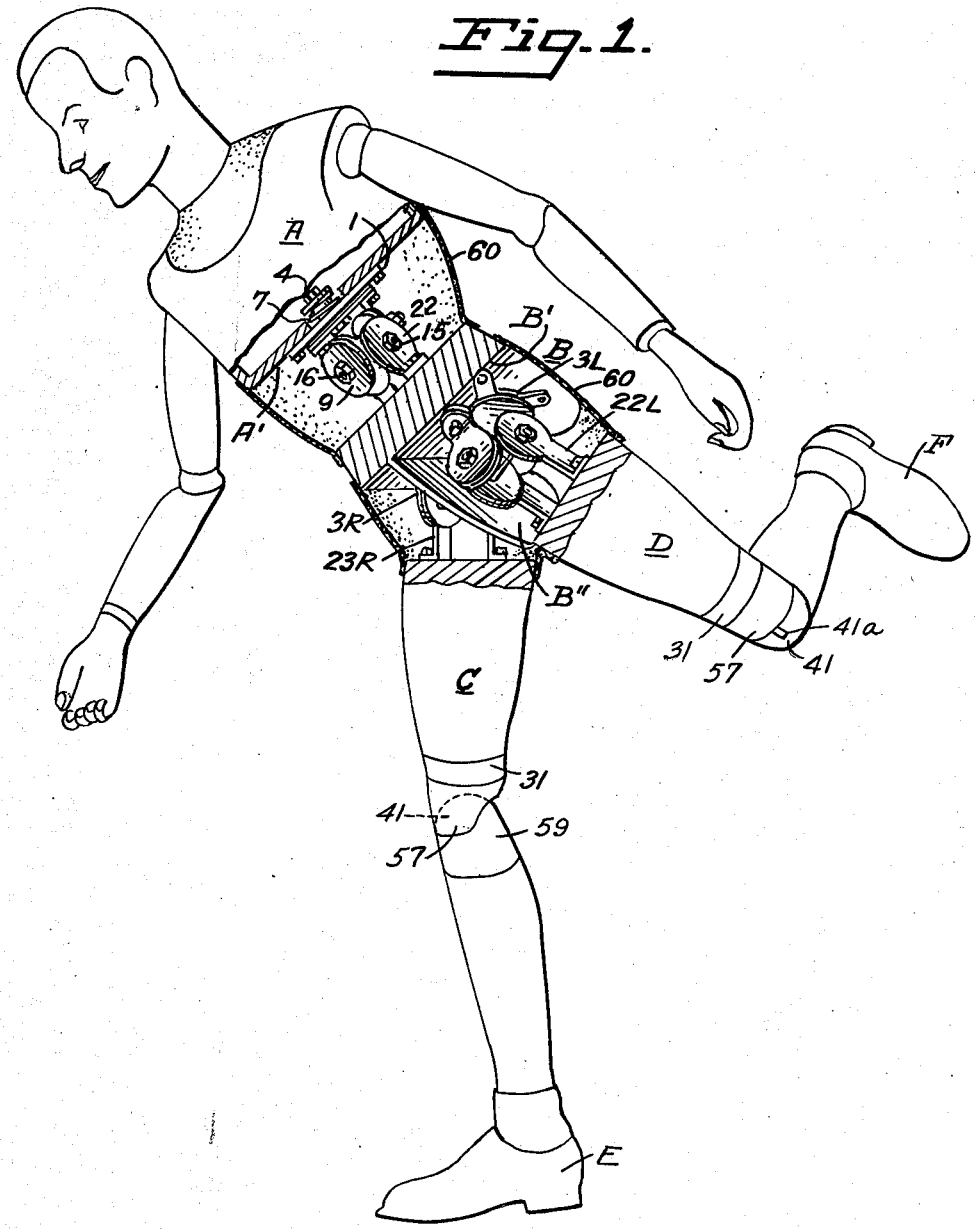
Fig. 1 is a front elevation of an articulated manikin simulating the human body poised in an upright posture, the masking fabric being broken away to disclose the mechanical joints at mid-riff and hip portions.

The mid-riff diaphragm B' between the torso and hip portions is preferably inclined upwardly from the buttock region of the hips to the forward edge of the diaphragm, as shown in Fig. 1. This permits a greater range of leg angles, from that shown at D, to an "up kick" with the leg practically vertical relative to the axis of the torso. Or the legs may be extended forwardly and rearwardly, as in doing the "split" in gymnastics. The inclined diaphragm B' also gives a bracing stability to the buttock contour at the rear.

The above described universal joint for the torso is duplicated for the control of the right and left legs of the manikin respectively. In each instance the top plates 3L, 3R are attached to the angular underside of the diaphragm B' in alinement with the axis of the right and left legs, respectively, to which the brackets 22L, 23R are attached, so that the thighs C, D are attached to the torso with axial and rotative adjustability, as described regarding the mid-riff portion of the torso. The brackets 22L, 23R are longer than the brackets 22, 23, permitting greater leg movement than required in the torso portion.

Figure 3:
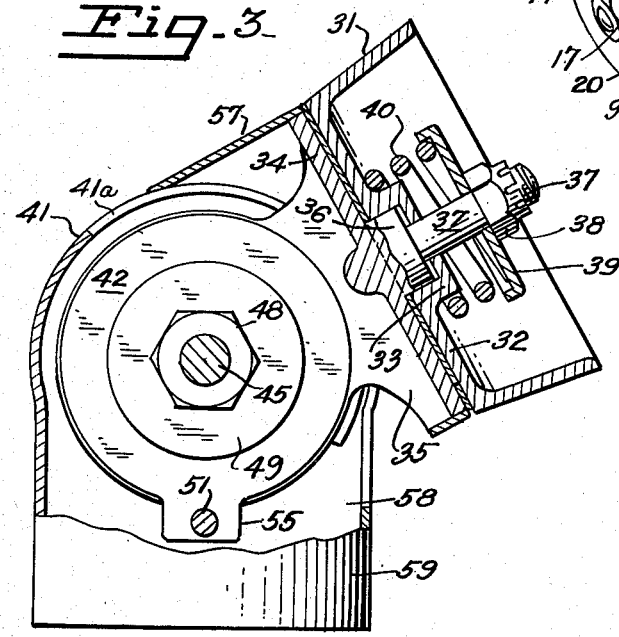
Fig. 3 is a side elevation detail of the knee joint with the ferrule, shield, hemispherical ball head and extension with the ferrule, guard and leg extension broken away to disclose the underlying structure.
Figure 4:
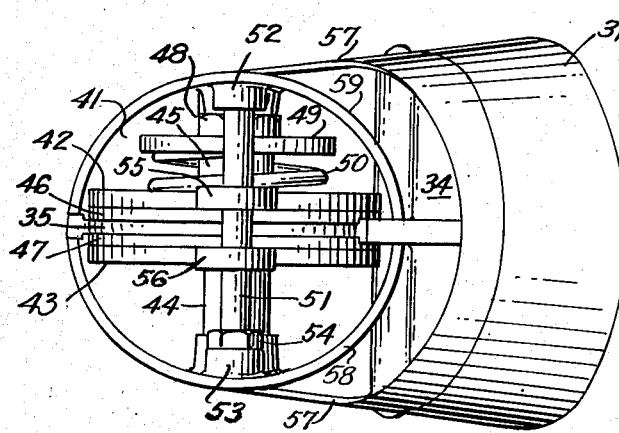
Fig. 4 is an elevation of the same from below, looking from below into the shin socket of the knee joint and showing the frictional assembly.

The knee joints in accordance with the present invention, are shown in detail in Figs. 3 and 4 and comprise the ferrule such as 31, attached to the lower end of the thigh. This ferrule has the head 32 with the center hub 33. The circular head 34 of the knee joint has the center web 35 depending therefrom, and the stud base 36 projecting within the hub 33. The stud bolt 37 is fixed in the base 36 and projects upward into the ferrule and has the nut 38 thereon. This nut bears against the cap 39 to compress the expansive spring 40 against the head 32 and the fiber insert against the top of the circular head 34, to create the required friction to hold the knee in manually rotated position on the axial stud 37.

The divided head 41 of the knee, Fig. 3, is divided vertically and has the opposed pressure plates 42, 43 having the stems 44, 45 respectively fixed in the lateral halves of the knee at the longitudinal center of the hemispherical ball head 41, and are fixed within sockets in the opposite sides of the ball head. These pressure plates bear against the fiber friction inserts 46, 47 against which the pressure plates are forced by the nut 48 threaded on the stem 45 and bearing against the washer 49, and the expansion spring 50, surrounding the stem 45. These pressure plates 42, 43 are held against rotation by the transverse bolt 51 fixed in the boss 52 of the ball head 41, and threaded in the boss 53 and locked by the lock nut 54. This bolt passes through the peripheral lugs 55, 56 on the pressure plates. To improve the outward appearance of the ball head 41 the center web 35 has a peripheral flange overhanging and concealing the fiber inserts 46, 47. As shown in Figure 3, the hemispherical head 41 is provided with an arcuate slot 41a to permit movement of the web 35.

A particular feature of this knee joint is the annular shield 57 encircling and attached to the ferrule head 34 and overhanging the diameter of the ball head 41. It is cut back to the ferrule 31 from the transverse diameter of the ball head as at 35, Fig. 3. This allows clearance in the shield when the knee bosses 52, 53 are bent backward to the limit. (See Figure 1.) The downward extensions 58, 59 of the hemispherical head 41 form an open socket to receive the upper calf portions of the legs, as in Fig. 1. It is a function of the shield 57 to prevent the displayed garment wrinkling into the gap between the ball head and the ferrule and to present a more natural simulation of the human knee.

Either foot E or F may be toed in or out by rotating the whole leg on the swivel studs 37 of the knee joints. This enables the use of a simple joint at the ankles.

The major portions of the manikin body are formed of molded papier mâché, plastic or the like in the usual manner, to provide sufficient strength when used as leverage to manually overcome the friction provided to hold the several joints in adjusted positions.

The neck, mid-riff, hip and ankle joints are concealed by a fabric masking 60 securely attached to the adjacent portions of the body and the partition B", simulating the abdominal contour. The masking is in the nature of a heavy knitted fabric that will prevent portions of the garment being displaced and entering the open gaps in the manikin body adjacent the several joints described.

The various mechanical joints are preferably formed of aluminum alloy to save weight, but it is not a good metal-to-metal friction material, which is corrected by the fiber inserts at the frictional areas.

Having fully described this invention and its mode of operation what I claim and desire to secure by Letters Patent is:

1. A knee joint in the class described comprising a circular head having a depending center web and an upstanding stud bolt; a ferrule frictionally engaging the top of said head and pivotal on said stud bolt; opposed pressure plates having depending lugs frictionally engaging the opposite sides of said web; a hemispherical head having a circumferential slot therein clearing said web on the circular head; a transverse stem extending across said hemispherical head and through said web and opposed pressure plates; a transverse bolt extending across said hemispherical head and through said depending lugs on said opposed pressure plates and holding them against rotation relative to said hemispherical head; and an expansion means interposed between one of said opposed plates and the adjacent side of said hemispherical head.

2. A manikin knee joint comprising a circular head representing the transverse section above the knee having a depending center web and an upstanding stud bolt; a ferrule frictionally engaging the top of said head and rotatable about the axis of said stud bolt; opposed pressure plates having depending lugs frictionally engaging the opposite sides of said web; a hemispherical head integral with a downward extending socket for juncture with leg members below the knee, said head having an arcuate slot therein clearing said web on the circular head; a transverse stem extending across said hemispherical head and through said web and opposed pressure plates; a transverse bolt extending across said hemispherical head and through said depending lugs on said opposed pressure plates holding them against rotation relative to said hemispherical head; expansion means interposed between one of said opposed pressure plates and the adjacent side of said hemispherical head; and a shield attached to said circular head to outwardly conceal the arcuate slot in the said hemispherical head.

CARMEN BARRANGO.

REFERENCES CITED

The following references are of record in the file of this patent:

UNITED STATES PATENTS

| Number | Name | Date |
|---|---|---|
| 292,927 | Lipe | Feb. 5, 1884 |
| 318,772 | McCumber | May 26, 1885 |
| 595,196 | Newman et al. | Dec. 7, 1897 |
| 817,511 | Palmenberg | Apr. 10, 1906 |
| 833,567 | Ward | Oct. 16, 1906 |
| 1,191,691 | Greenwald | July 18, 1916 |
| 1,380,121 | Stitzer | May 31, 1921 |
| 2,215,500 | Greneker | Sept. 24, 1940 |
| 2,362,383 | Lendinara | Nov. 7, 1944 |
| 2,432,216 | Suczek | Dec. 9, 1947 |
| 2,441,347 | Dodge | May 11, 1948 |

FOREIGN PATENTS

| Number | Country | Date |
|---|---|---|
| 21,167 | Great Britain | Oct. 18, 1905 |